(12) United States Patent
Kammeraad

(10) Patent No.: US 6,481,407 B1
(45) Date of Patent: Nov. 19, 2002

(54) THIN-WALLED VALVE GUIDE INSERT AND METHOD FOR INSTALLING SAME WITHIN A CYLINDER HEAD CONSTRUCTION

(75) Inventor: James A. Kammeraad, Holland, MI (US)

(73) Assignee: K-Line Industries, Inc., Holland, MI (US)

( * ) Notice: Subject to any disclaimer, the term of this patent is extended or adjusted under 35 U.S.C. 154(b) by 0 days.

(21) Appl. No.: 09/540,269

(22) Filed: Mar. 31, 2000

(51) Int. Cl.$^7$ ................................................. F01L 3/08
(52) U.S. Cl. ................................................. 123/188.9
(58) Field of Search .................... 123/188.9; 29/888.41, 29/890.126

(56) References Cited

U.S. PATENT DOCUMENTS

| | | |
|---|---|---|
| 167,688 A | 9/1875 | Puffer |
| 2,288,340 A | 6/1942 | Yates |
| 3,021,596 A | 2/1962 | Yowell et al. |
| 3,265,052 A * | 8/1966 | Goloff ...................... 123/188.9 |
| 3,345,976 A * | 10/1967 | Pope et al. .............. 123/188.9 |
| 3,489,220 A | 1/1970 | Kinley |
| 3,793,711 A | 2/1974 | Heiress |
| 3,809,046 A | 5/1974 | Kammeraad |
| 3,828,415 A | 8/1974 | Kammeraad et al. |
| 3,828,756 A * | 8/1974 | Kammeraad et al. .... 123/188.9 |
| 3,998,199 A * | 12/1976 | Melchior ................. 123/188.9 |
| 4,103,662 A | 8/1978 | Kammeraad |
| 4,185,368 A | 1/1980 | Kammeraad |
| 4,240,393 A * | 12/1980 | Rosan, Jr. ................ 123/188.9 |
| 4,433,567 A | 2/1984 | Mead |
| 4,573,340 A | 3/1986 | Kammeraad |
| 4,768,479 A * | 9/1988 | Kammeraad ............. 123/188.9 |
| 4,986,230 A | 1/1991 | Panyard et al. |
| 5,014,779 A | 5/1991 | Meling et al. |
| 5,140,956 A | 8/1992 | Seward |
| 5,249,555 A * | 10/1993 | Kammeraad et al. .... 123/188.9 |
| 5,287,621 A | 2/1994 | Usui |
| 5,355,572 A | 10/1994 | Kammeraad et al. |
| 5,465,691 A * | 11/1995 | Capaldo .................. 123/188.9 |
| 5,493,776 A | 2/1996 | Kammeraad et al. |
| 5,507,257 A * | 4/1996 | Sakai et al. .............. 123/188.9 |
| 5,539,980 A * | 7/1996 | Kammeraad et al. .... 123/188.9 |

FOREIGN PATENT DOCUMENTS

GB 869384 5/1961

* cited by examiner

*Primary Examiner*—Gene Mancene
*Assistant Examiner*—Jason Benton
(74) *Attorney, Agent, or Firm*—Price Heneveld Cooper DeWitt & Litton

(57) ABSTRACT

A valve guide insert for lining and relining a valve guide bore in an internal combustion engine, where the internal combustion engine includes a valve with a valve stem, and the valve guide bore is configured to support the valve stem for reciprocal motion. The valve guide insert includes a thin-walled, cylindrically shaped, metallic tube made from reformable bearing material suitable for slidably supporting a valve stem in a combustion engine, wherein the tube has a temporary retainer section and a long section. The retainer section defined a first outer diameter, and the long section defines a second outer diameter that is less than the first outer diameter, whereby the tube is configured to be dropped into a valve guide bore having a bore diameter less than the first outer diameter but greater than the second outer diameter. The valve guide insert may have a wall thickness of 0.008 inches or less.

28 Claims, 3 Drawing Sheets

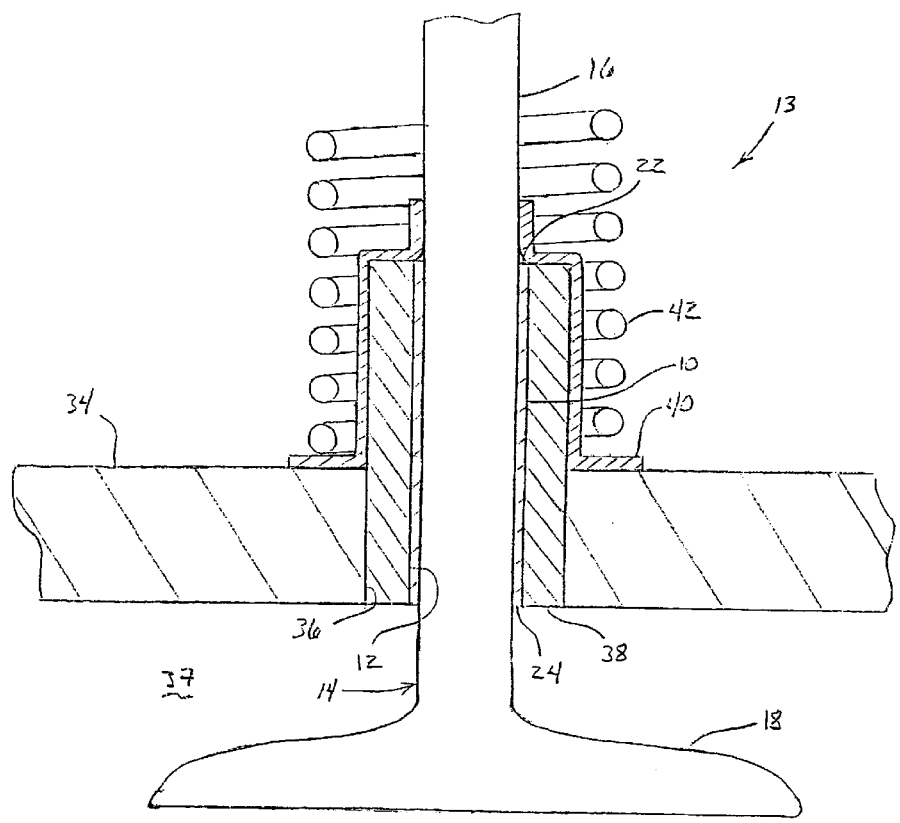
FIG. 5
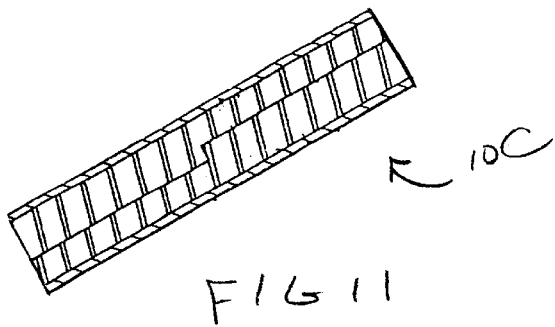
FIG 11
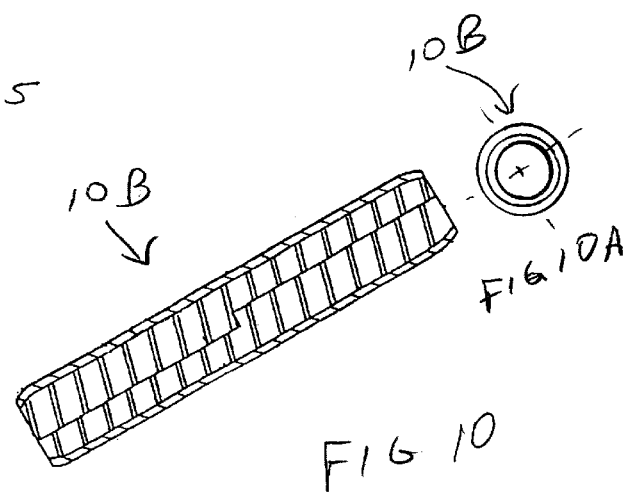
FIG 10A
FIG 10

THIN-WALLED VALVE GUIDE INSERT AND METHOD FOR INSTALLING SAME WITHIN A CYLINDER HEAD CONSTRUCTION

BACKGROUND OF THE INVENTION

The present invention relates to a valve guide insert for use in internal combustion engines and the like, and in particular to a thin-walled valve guide insert.

Valve guide inserts are commonly used in the construction and rebuilding of cylinder heads in internal combustion engines. More particularly, valve guide inserts are used to provide a wear resistant bearing surface between cylinder heads and the associated valves. Through extended use, valve guides within internal combustion engines can become worn, thereby allowing the associated valve to become sloppy within an associated cylinder. This sloppiness may result in improper seating of the valve or even the failure of the engine.

Cylinder heads associated with internal combustion engines are typically cast from iron or other non-durable metals. Valve guide inserts have become useful within the vehicle engine manufacturing industry by providing a hardened bearing surface between the valve guides and the associated valves, thereby increasing the useful life of the valve guides. Valve guide inserts have also become useful in the engine refurbishing industry by allowing for a worn guide to be broached and a valve guide insert to be inserted within the resized valve guide, thereby allowing for the continued use of the engine.

Heretofore, valve guide inserts were tubular shaped members formed of a hardened wear resistant metal. Typically, the valve guide inserts were press-fit into a valve guide bore of a cylinder head by way of a mechanical device that forcibly inserted the valve guide inserts within the valve guide bores. A broaching tool was then forced through the valve guide insert to form an interior bore for guiding the associated valve, as well as to create a tight fit of the valve guide insert within the valve guide floor.

A problem associated with use of thin-walled valve guide inserts is the tendency for the inserts to unacceptably deform or crumble during installation. This occurs due to the tight fit of the entire valve guide insert within the valve guide bore, as well as due to the force applied to the valve guide insert by the mechanical apparatus used to insert the valve guide insert into the valve guide bore. The thinner the insert, the more apt deformation will occur during the insertion process.

Another problem associated with using valve guide inserts in the refurbishing of cylinder heads is the requirement of re-boring the valve guide to allow placement of the valve guide insert therein. The more material that is required to be removed from the valve guide the greater the chance of cracking and destroying the valve guide during the re-boring procedure. Therefore, the thinner the wall thickness of the valve guide insert, the less material must be removed from the valve guide and the less chance of destroying the valve guide. However, the thinner the wall thickness of the valve guide insert, the greater the chance of unacceptable deformation or crumbling of the valve guide insert during the installation process.

Yet another problem associated with the use of thin-walled valve guide inserts is the tendency for the valve guide insert, if not properly installed to work lose from the associated valve guide, resulting in possible engine failure.

SUMMARY OF THE INVENTION

One aspect of the present invention is to provide a valve guide insert for lining and relining a valve guide bore in an internal combustion engine, wherein the internal combustion engine includes a valve with a valve stem, and the valve guide bore is configured to support the valve stem for reciprocal motion. The valve guide insert includes a thin-walled, cylindrically shaped, metallic tube made from a reformable bearing material suitable for slidably supporting a valve stem in a combustion engine, wherein the tube has a temporary retainer section and a long section, the retainer section defining a first outer diameter, and the long section defining a second outer diameter that is less than the first outer diameter, whereby the tube is configured to be dropped into a valve guide bore having a bore diameter less than the first outer diameter but greater than the second outer diameter.

Another aspect of the present invention is to provide a method for lining and relining a valve guide bore in an internal combustion chamber, wherein the internal combustion engine includes a valve with a valve stem, and the valve guide bore defines an outer diameter and is configured to support the valve stem for reciprocal motion. The method includes providing a thin-walled, generally cylindrically shaped, metallic tube having a long section and a retainer section, wherein the retainer section defines a first outer diameter, and the long section defines a second outer diameter that is less than the first outer diameter. The method further includes dropping the tube into a valve guide bore such that the retainer section having the first outer diameter of the tube contacts the inner diameter of the valve guide bore, and broaching the tube, thereby creating a tight fit of the tube within the valve guide bore of the internal combustion engine.

Yet another aspect of the present invention is to provide a valve guide insert for lining and relining a valve guide bore in an internal combustion engine, wherein the internal combustion engine includes a valve with a valve stem, and the valve guide bore is configured to support the valve stem for reciprocal motion. The valve guide insert includes a thin-walled, generally cylindrically shaped, tube made from reformable material and that has a first end and a length, wherein the first end has a retainer at the first end that defines a first outer diameter, and wherein the length has inwardly formed longitudinally-extending channels formed therein such that the length has a outer diameter smaller than the first outer diameter.

Yet still another aspect of the present invention is to provide a method that includes providing a cylinder head of an internal combustion engine, wherein the cylinder head includes a valve guide bore, and reboring the valve guide bore to a predetermined diameter. The method further includes providing a valve guide liner shaped to slip into the valve guide bore with finger pressure and inserting the valve guide bore liner into the valve guide bore.

Yet another aspect of the present invention is to provide a valve guide insert for lining and relining a valve guide bore in an internal combustion engine, wherein the internal combustion engine includes a valve with a valve stem, and the valve guide bore is configured to support the valve stem for reciprocal motion. The valve guide insert includes a thin-walled, cylindrically shaped, metallic tube made from reformable bearing material suitable for slidably supporting a valve guide stem in a combustion engine, wherein the tube has a wall thickness of 0.008 inches or less.

These and other features, advantages, and objects of the present invention will be further understood and appreciated by those skilled in the art by reference to the following specification, claims, and appended drawings.

BRIEF DESCRIPTION OF THE DRAWINGS

FIG. 5 is a cross-sectional view of the valve section of a cylinder head of an internal combustion engine;

FIGS. 10 and 10A are side and end views of a modified valve guide insert having a 0.008 inch thin wall; and FIG. 11 is a side cross sectional view of another modified valve guide insert having a 0.008 inch thin wall.

DETAILED DESCRIPTION OF PREFERRED EMBODIMENT

Figure 1:
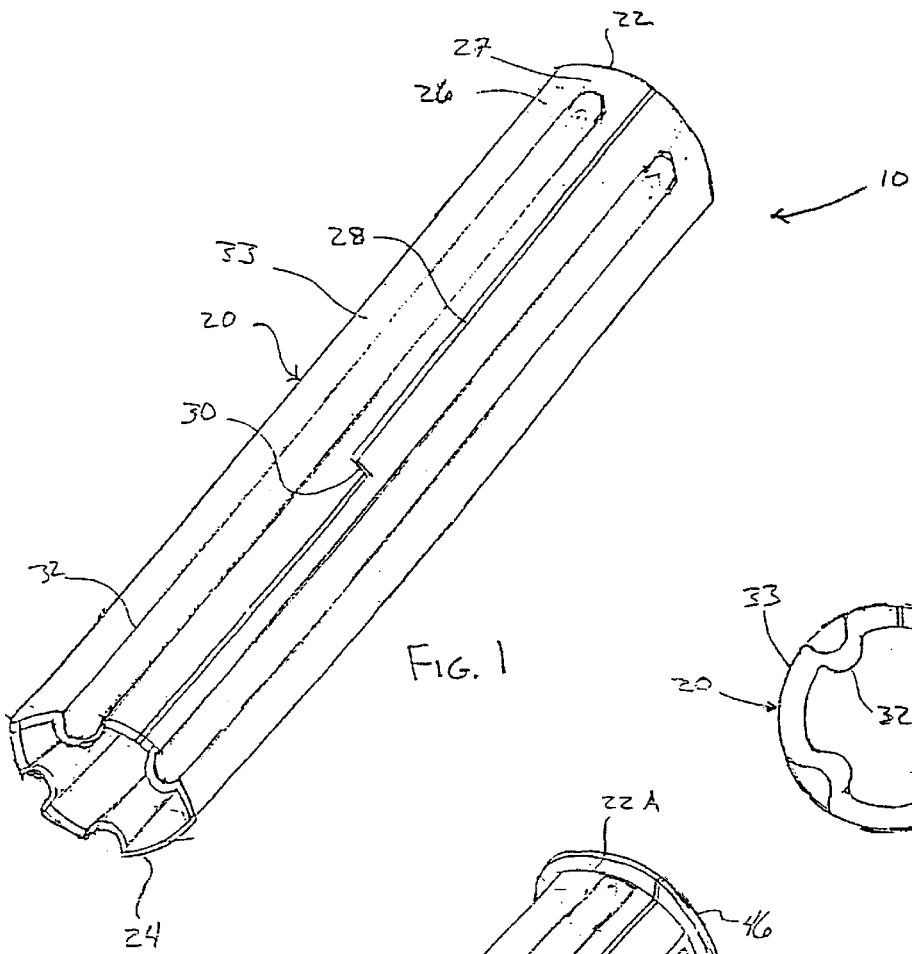
FIG. 1 is a perspective view of a valve guide insert embodying the present invention.
Figure 3:
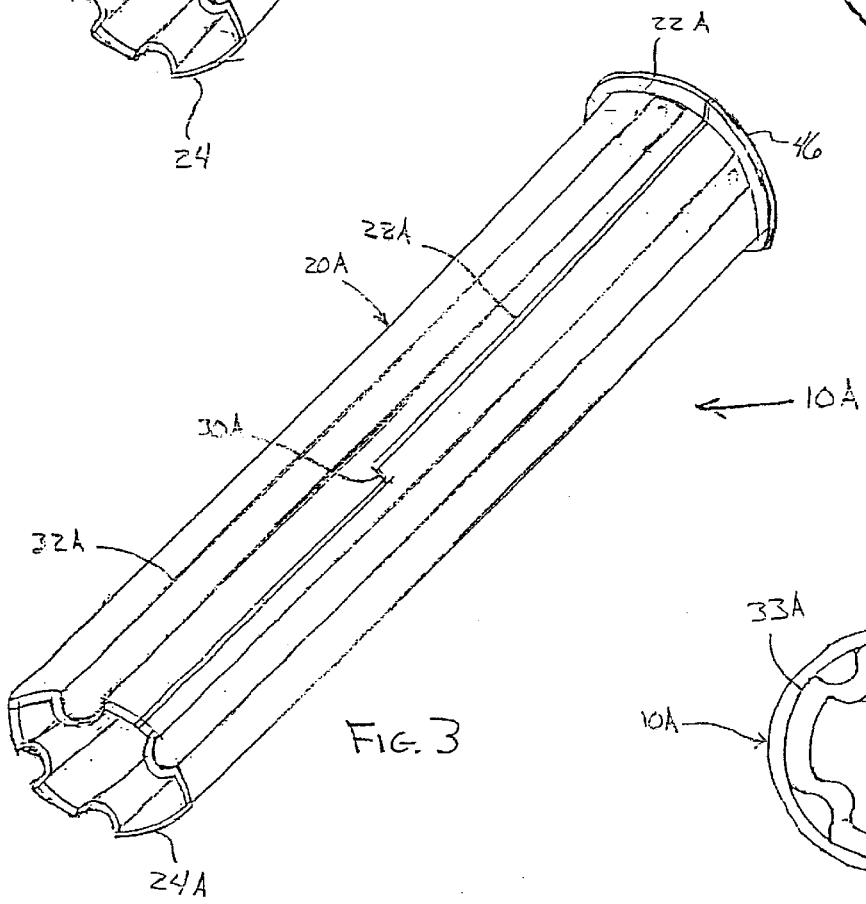
FIG. 3 is a perspective view of an alternative embodiment of the valve guide insert.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a valve guide insert or valve guide liner for lining and relining a valve guide bore 12 (FIG. 5) in an internal combustion engine (not shown). The internal combustion engine includes a valve section 13 that includes a valve 14 having a valve stem 16 and a valve head 18. The valve guide bore 12 is configured to support the valve stem 18 for reciprocal motion.

Figure 2:
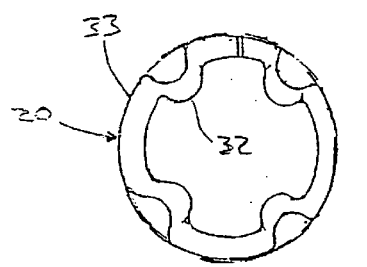
FIG. 2 is a bottom plan view of the valve guide insert.

Valve guide insert 10 (FIGS. 1 and 2) includes a thin-walled, generally cylindrically shaped tube 20 having a first end 22, a second end 24, an intermediate or long section 26 located between first end 22 and second end 24, and a shoulder or temporary retainer section 27 located between first end 22 and intermediate section 26. Shoulder 27 defines a first outer diameter, while intermediate section 26 and second end 24 define second outer diameters that are less than the first outer diameter of shoulder 27, such that tube 20 can be dropped into valve guide bore 12 which has a bore diameter less than the first outer diameter of shoulder 27 but greater than the second outer diameters of intermediate section 26 and second end 24.

Tube 20 further includes a longitudinally extending slit 28 that extends along the entire length of tube 20. Slit 28 is provided a step or off-set 30 along its length. Slit 28 allows compression of tube 20 and reduction of the associated diameters of tube 20 as valve guide insert 10 is inserted into valve guide bore 12, and also allows for expansion of the associated diameters of tube 20 as the valve guide insert is broached, both of which are described further below.

Tube 20 further includes at least one (and potentially a plurality of) longitudinally extending channel 32 that preferably extends at least about 90% of a length of the tube 20. The number of channels 32 provided may be varied depending upon the expansive properties required in a particular application. Channels 32 are inwardly formed and have a U-shaped cross-sectional geometry. The length of the wall forming the channels 32 is shaped to cause an interference fit when expanded to the diameter of the valve guide bore by broaching, as discussed below. However, it is contemplated that other cross-sectional geometries or wall lengths may be used or incorporated. Channels 32 define circumferentially extending portions 33 therebetween. Channels 32 allow for expansion of tube 20 during the broaching process as discussed below, as well as providing structural rigidity to tube 20. In the illustrated example, channels 32 extend along tube 20 between second end 24 of tube 20 and intermediate section 26 of tube 20. Channels 32 are equidistantly spaced about the circumference of tube 20.

A cylinder head 34 (FIG. 5) of the internal combustion engine (not shown) is constructed of a non-durable material such as iron or aluminum, and is provided with a plurality of bores 36 that extends through cylinder head 34 and into an associated cylinder area 37. A powdered metal slug or valve guide 38 that includes valve guide bore 12 is located within bore 36 of cylinder head 34 to provide structural support to valves 14, as well as to provide improved wear and heat dissipation properties with respect to cylinder head 34. An outer boss cap 40 may be used to provide additional support at an upper end of valve guide 38, as well as to provide structure for supporting a lower end of a valve return spring 42.

Figure 6:
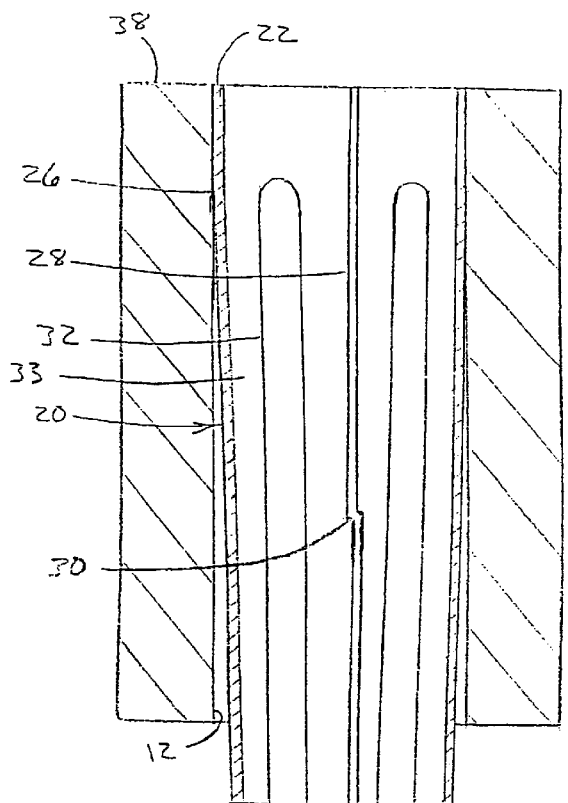
FIG. 6 is a cross-sectional view of a valve guide and the valve guide insert.

In assembly, valve guide insert 10 (FIGS. 5 and 6) is inserted into valve guide bore 12 of valve guide 38 during construction or refurbishing of the associated engine to provide additional bearing surface structure between valve guide 38 and valve 14. As a result of the second outer diameters of second end 24 and intermediate section 26 being slightly smaller than the diameter of valve guide bore 12 of valve guide 38, valve guide insert 10 can be inserted within the valve guide bore 12 of valve guide 38 by hand with light finger pressure. The illustrated valve guide insert 10 is configured for drop-in installation and does not need to be interference fit into position with aid of a special tool. In addition, as a result of the first outer diameter of shoulder 27 being slightly larger than the diameter of the valve guide bore 12, valve guide insert 10 is frictionally held within valve guide bore 12, thereby preventing valve guide insert 10 from being pushed or falling through valve guide bore 12 during either the insertion of the valve guide insert 10 into the valve guide bore 12 or during the broaching process as discussed below. Channels 32 provide structural rigidity to tube 20 of valve guide insert 10, thereby decreasing the possibility of deformation of tube 20 as valve guide insert 10 is inserted into valve guide bore 12. In the drop inserted position in the valve bore, the slit 28 is closed or nearly closed.

Figure 7:
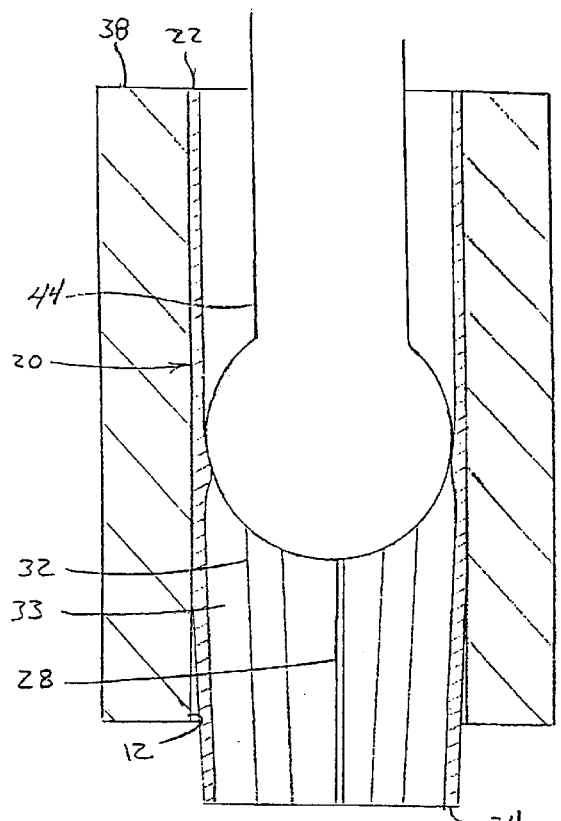
FIG. 7 is a cross-sectional view of the valve guide and the valve guide insert with a broaching tool inserted therein.
Figure 9:
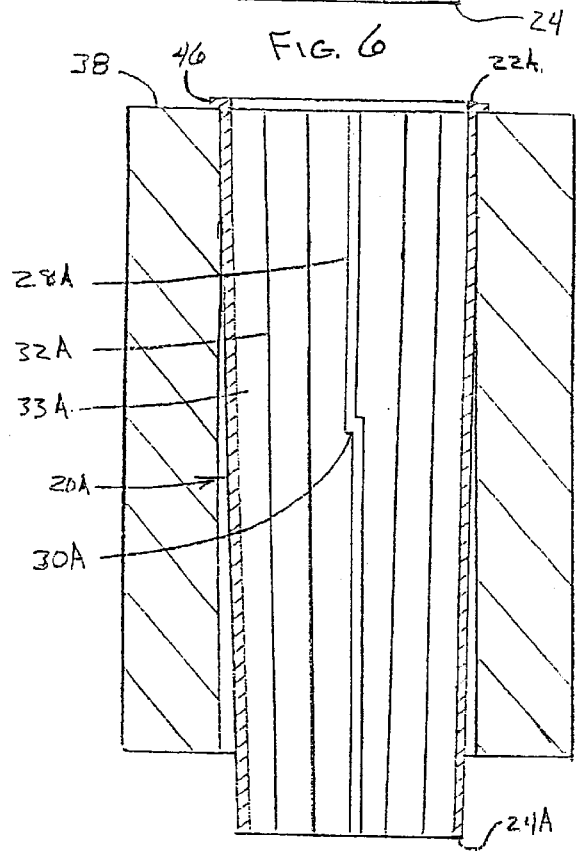
FIG. 9 is a cross-sectional view of the valve guide with the alternative embodiment of the valve guide insert inserted within the valve guide.

A ball broach 44 (FIG. 7) is then used to expand the channels 32 outwardly to a uniform diameter with circumferentially extending portions 33. During broaching, channels 32 are formed outwardly so that valve guide insert 10, as installed, becomes a cylindrical shape that is frictionally retained by tight contact against valve guide 38. For example, a broaching tool, such as that disclosed in U.S. Pat. No. 4,573,340, VALVE GUIDE LINER BROACHING TOOL, can be used. It is contemplated that the broaching tool of patent '340 can be modified so that the insert 10 can be loaded onto the broaching tool, and thereafter the broaching tool can be used to both initially position valve guide insert 10 into valve guide bore 12 and also to broach the valve guide insert 10. Thus, the insertion of valve guide insert 10 into valve guide bore 12 as well as the broaching step would occur with a single motion. It is noted that the inner surface of the tube 20 may include spiral, discontinuous grooves for better oil retention. These discontinuous inner grooves are not illustrated in the present drawings because they are well known in the art and are not needed to understand the present invention. However, such spiral grooves are shown in U.S. Pat. No. 5,355,572. The material of valve guide insert 10 is strong enough to retain the grooves even after broaching.

Figure 8:
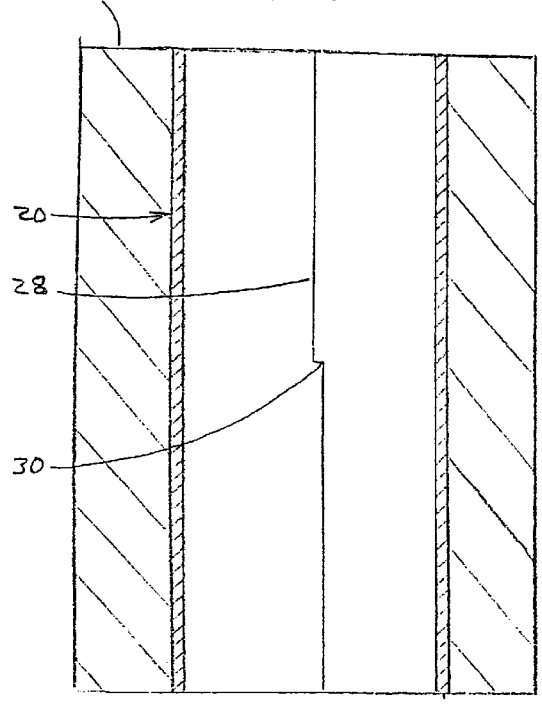
FIG. 8 is a cross-sectional view of the valve guide and the valve guide insert after broaching and trimming steps.

After installation and broaching, first end 22 and/or second end 24 of tube 20 may be trimmed, thereby resulting in a custom fit of the valve guide insert 10 within valve guide bore 12, such as shown in FIG. 8.

Figure 4:
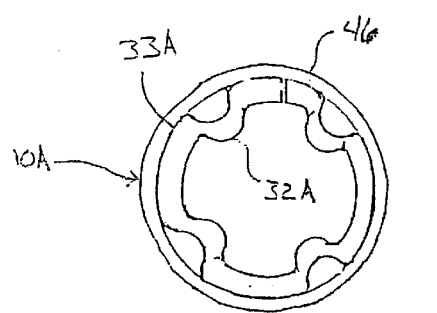
FIG. 4 is a bottom plan view of the alternative embodiment of the valve guide insert.

The reference numeral 10A (FIGS. 3 and 4) generally designates another embodiment of the present invention. Since valve guide insert 10A is similar to the previously described valve guide insert 10, similar parts appearing in FIGS. 1, 2 and 6 and FIGS. 3, 4 and 9, respectively, are represented by the same, corresponding reference numeral, except for the suffix "A" in the numerals of the latter.

Valve guide insert 10A includes a radially outwardly extending flange 46 attached to first end 22A of tube 20A. The outer diameter of first end 22A and the outer diameter of the second end 24A are each slightly less than the diameter of valve guide bore 12 (FIG. 5), thereby allowing easy drop-in installation of the valve guide insert 10A into valve guide bore 12 of valve guide 38. Valve guide insert 10A further includes channels 24A that are similar in geometric shape to channels 24 (FIG. 1) of vehicle guide insert 10. Channels 24A extend between first end 22A and second end 24A of tube 20A.

In assembly, tube 20A (FIG. 9) of valve guide insert 10A is dropped or inserted into valve guide bore 12 until flange 46 contacts valve guide 38. Flange 46 holds valve guide insert 10A within valve guide bore 12 of valve guide 38, thereby eliminating the possibility of valve guide insert 10A being pushed or falling through valve guide bore 12 of valve guide 38 during the insertion or broaching steps. It should be noted that flange 46 of valve guide insert 10A forms a retainer section and can be used either in place of or in conjunction with shoulder 33 of valve guide insert 10.

Valve guide inserts 10 and 10A have an improved structural rigidity, despite their wall thinness, and further are sized for drop-in installation, thereby reducing the possibility of deformation of the valve guide inserts 10 and 10A during insertion into valve guide 38. In addition, the reduced diameters of the valve guide inserts 10 and 10A eliminates the necessity of using a specialized tool for inserting the valve guide inserts 10 and 10A into the valve guide bore 12. Alternatively, valve guide inserts 10 and 10A may be used in cooperation with the proper broaching equipment to both insert and broach the valve guide insert 10 in a single operation, thereby eliminating the need for a two step process of insertion and the broaching.

In construction, valve guide inserts 10 and 10A can be formed from a flat piece of thin sheet metal. Valve guide inserts 10 and 10A are constructed from a resilient and/or hardened metal suitable for use as a bearing material, such as phosphor bronze or a material exhibiting similar properties. The illustrated material is 0.008 inches thick. It is surprising and unexpected that material this thin is able to engage the valve bore with sufficient friction to stay in place during broaching and later when in service. However, testing has shown that the retention of the broached valve guide insert 10 is excellent and, if properly installed, entirely sufficient. Notably, the thinness of 0.008 inches advantageously assists in heat transfer since thinner valve guide inserts have a much better rate of heat transfer. It has been discovered that a cylindrically shaped valve guide insert 10A (FIG. 9) having a wall thickness of 0.008 inches and a bullet-nose shape (FIGS. 9 and 9A) can also be made and successfully used. The inserts 10A and 10B can be sized for drop-in or interference-fit installation. More information on the details of friction-fit valve guide inserts and tools for installing them can be found in U.S. Pat. No. 5,539,980 (to Kammeraad), the entire contents of which are incorporated herein. It is noted that when valve guide inserts having a thin wall of 0.008 inches or less are used, the tolerances and installation procedures must be carefully controlled to prevent crinkling and destruction of the inserts 10A and 10B during installation. Nonetheless, such inserts 10A and 10B can be used and do have sufficient retention strength to work very well. Further, as the installation pressures are reduced by reducing the interference upon insertion, the percent of scrap caused by poor installation is greatly reduced. Also, the thinness of the wall stock of the inserts improves heat transfer yet provides an insert that is well-secured to the vehicle cylinder head.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A valve guide insert for lining and relining a valve guide bore in an internal combustion engine, the internal combustion engine including a valve with a valve stem, and the valve guide bore being configured to support the valve stem for reciprocal motion, comprising:
   a one-piece thin-walled, cylindrically shaped, metallic tube made from reformable bearing material suitable for slidably supporting a valve stem in a combustion engine, the tube having a temporary retainer section and a long section, said retainer section defining a first outer diameter, and said long section defining a second outer diameter that is less than said first outer diameter, whereby said tube is configured to be easily slid into a valve guide bore having a bore diameter less than said first outer diameter but greater than said second outer diameter, the temporary retainer section including a longitudinally-elongated tubular shoulder section having the first outer diameter, wherein said tube includes a constant-thickness wall defining at least one longitudinal channel extending along at least a portion of a length of said tube.

2. The valve guide insert defined in claim 1, wherein the temporary retainer section includes a radially extending flange.

3. The valve guide insert defined in claim 1, wherein said at least one channel is provided an arcuate cross-sectional shape.

4. The valve guide insert defined in claim 3, wherein said at least one channel extends radially inward.

5. The valve guide insert defined in claim 4, wherein said at least one channel extends along a partial length of said tube.

6. The valve guide insert defined in claim 5, wherein said long section includes an end of said tube opposite the shoulder, and wherein said at least one longitudinal channel extends a full length said long section of said tube.

7. The valve guide insert defined in claim 6, wherein said at least one longitudinal channel includes at least two longitudinal channels, said at least two longitudinal channels spaced equidistant about said tube.

8. The valve guide insert defined in claim 1, wherein said tubular shoulder section includes an elongated cylindrically-shaped section formed on a first end of said tube.

9. The valve guide insert described in claim 1, wherein said tube includes walls having a thickness of about 0.008 inches.

10. The valve guide insert defined in claim 1, wherein said tube includes at least one longitudinal channel extending between said second end and said intermediate position of said tube.

11. The valve guide insert defined in claim 1, wherein said tube includes at least two longitudinal channels extending along at least a portion of a length of said tube, and wherein said at least two longitudinal channels are spaced equidistant about said tube.

12. A method for lining and relining a valve guide bore in an internal combustion engine, the internal combustion engine including a valve with a valve stem, and the valve guide bore defining an inner diameter and being configured to support the valve stem for reciprocal motion, comprising:
   providing a thin-walled, generally cylindrically shaped, metallic tube having a constant wall thickness of less than or equal to 0.008 inches and having a long section and a retainer section, the retainer section defining a first outer diameter, the long section defining a second outer diameter that is less that the first outer diameter;
   dropping the tube into a valve guide bore having an inner diameter an inner diameter less than the first outer diameter but greater than the second outer diameter to create a non-frictional fit on the long section, such that the long section easily slides into the valve guide bore; and
   broaching the tube, thereby creating a tight fit of the tube within the valve guide bore of the internal combustion engine.

13. A method for lining and relining a valve guide bore in an internal combustion engine, the internal combustion engine including a valve stem, and the valve guide bore defining an inner diameter and being configured to support the valve stem for reciprocal motion, comprising:
   providing a thin-walled , generally cylindrically shaped, metallic tube having a long section and a retainer section, the retainer section defining a first outer diameter, the long section defining a second outer diameter that is less that the first outer diameter;
   dropping the tube into a valve guide bore such that the first outer diameter of the tube contacts the inner diameter of the valve guide bore;
   broaching the tube, thereby creating a tight fit of the tube within the valve guide bore of the internal combustion engine; and
   wherein said step of providing the tube includes providing the tube with at least one longitudinal channel extending along at least a portion of a length of the tube, and wherein said step of broaching includes reforming the at least one longitudinal channel against the valve guide bore.

14. The method defined in claim 13, wherein the retainer section includes a radially extending annular flange, and wherein the step of dropping the tube includes abutting the annular flange against the valve guide bore.

15. A valve guide insert for lining and relining a valve guide bore in an internal combustion engine, the internal combustion engine including a valve with a valve stem, and the valve guide bore configured to support the valve stem for reciprocal motion, comprising:
   a thin-walled, generally cylindrical shaped, tube made from reformable materials and having a constant-thickness wall, a first end and a length, said length having at least one inwardly-formed outwardly deformable longitudinally-extending channel such that said length has an outer diameter smaller than a portion of the tube not having of the channels.

16. The valve guide insert defined in claim 15, wherein said tube defines a thickness, and wherein said thickness is less than or equal to about 0.008 inches.

17. The valve guide insert defined in claim 16, wherein said tube is less than 0.008 inches.

18. The valve guide insert defined in claim 15, wherein said at least one channel are each provided with an arcuate cross-sectional shape.

19. The valve guide insert defined in claim 15, wherein said tube includes a second end and an intermediate section located between said first end and said second end, and wherein said channel extends at least about 90% of a length of said tube.

20. The valve guide insert defined in claim 15, including a first end having a retainer that comprises a radially outwardly extending flange attached to said first end of said tube.

21. The valve guide insert defined in claim 15, wherein at least two of said channels are spaced equidistant about said tube.

22. A method comprising steps of:
   providing an cylinder head of an internal combustion engine, the cylinder head including a valve guide bore;
   reboring the valve guide bore to a predetermined diameter;
   providing a valve guide liner shaped to slip into the valve guide bore with finger pressure, including providing the valve guide liner with at least one longitudinally-extending channel.
   inserting the valve guide liner into the valve guide bore; and
   broaching the valve guide liner, thereby flattening the at least one channel of the valve guide liner into contact with the valve guide bore of the cylinder head and creating a tight fit therebetween.

23. The method defined in claim 22, wherein the retainer section includes a radially extending annular flange, and wherein the step of inserting the tube includes abutting the annular flange against the valve guide bore.

24. A valve guide insert for lining and relining a valve guide bore in an internal combustion engine, the internal combustion engine including a valve with a valve stem, and the valve guide bore being configured to support the valve stem for reciprocal motion, comprising:
   a thin-walled, cylindrically shaped, metallic tube made from reformable bearing material suitable for slidably supporting a valve stem in a combustion engine, the tube having a constant wall thickness of 0.008 inches or less, wherein said tube includes at least one longitudinal channel extending along at least a portion of a length of said tube.

25. The valve guide insert defined in claim 24, wherein the wall thickness is less than 0.008.

26. The valve guide insert defined in claim 24, wherein said bearing material includes phosphor bronze material.

27. An engine comprising a cylinder head with a valve guide bore, a valve with a valve stem, and the valve guide insert defined in claim 24, the valve guide insert being positioned in the valve guide bore in close engagement with the cylinder head and slidably engaging the valve stem in the valve guide bore and supporting the valve for reciprocal motion.

28. An apparatus comprising, in combination:

An internal combustion engine; and

A valve guide insert for lining and relining a valve guide bore in the internal combustion engine, the internal combustion engine including a valve with a valve stem, and the valve guide bore being configured to support the valve stem for reciprocal motion; the valve guide insert including thin-walled, cylindrically shaped, metallic tube made from reformable bearing material suitable for slidably supporting the valve stem in the internal combustion engine, the tube having a temporary retainer section and a long section, said retainer section defining a first outer diameter that is less than an inner diameter of the valve guide bore, and said long section defining a second outer diameter that is less than said first outer diameter but greater than the inner diameter of the valve guide bore, whereby said tube is configured to be easily moved into the valve guide bore and then enlarged by broaching to the diameter of the valve guide bore for supporting the valve stem, the tube having a wall thickness of less than about 0.008 inches.

* * * * *